T. H. WIEDER.
HOSE REPAIRER.
APPLICATION FILED JULY 9, 1910.
985,648.
Patented Feb. 28, 1911.
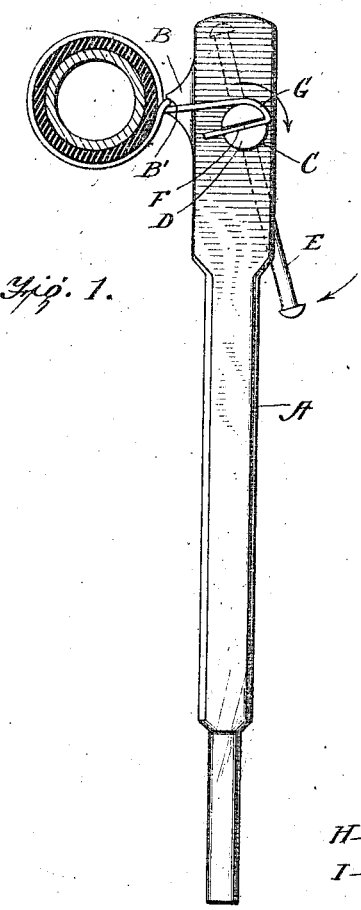
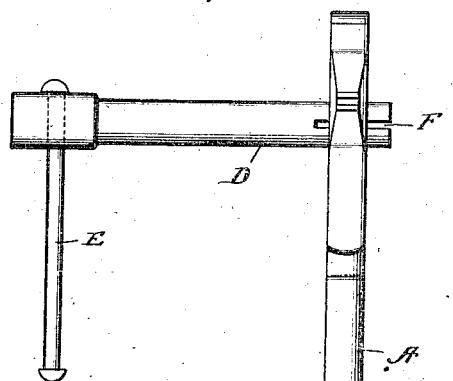
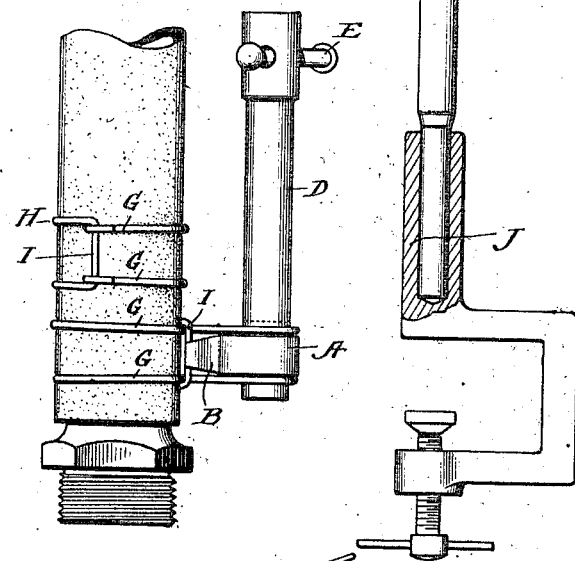
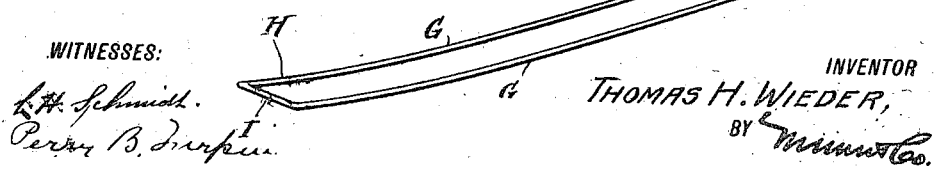
WITNESSES:
INVENTOR
Thomas H. Wieder,
BY
ATTORNEYS

UNITED STATES PATENT OFFICE.

THOMAS H. WIEDER, OF WARREN, OHIO.

HOSE-REPAIRER.

985,648.  Specification of Letters Patent.  Patented Feb. 28, 1911.

Application filed July 9, 1910. Serial No. 571,195.

*To all whom it may concern:*

Be it known that I, THOMAS H. WIEDER, a citizen of the United States, and a resident of Warren, county of Trumbull, and State of Ohio, have invented certain Improvements in Hose-Repairers, of which the following is a specification.

This invention is an improvement in devices for use in repairing hose, and for securing the ordinary fittings to hose by means of wire, and the invention has for an object to provide a simple and novel construction by which the wire may be looped and secured tightly around the hose over the fitting or connecting devices, to securely fasten the hose in place.

The invention consists in certain novel constructions and combinations of parts as will be hereinafter described and claimed.

In the drawings, Figure 1 is a side view of the invention as in use, the hose and fitting being in section. Fig. 2 is an edge view of the device as in use. Fig. 3 is a plan view of the device as in use. Fig. 4 is a detail view of the wire binder.

As shown, the improved device includes a lever A, having a fulcrum B, and provided with an opening C, in which is journaled a shaft or drum D, having a sliding handle E, and provided with a longitudinal slot F, in which is received the arms G of the wire binder H, which latter has a cross bar I, from the opposite ends of which project the arms G, as best shown in Fig. 4 of the drawing.

In the operation of the construction, it will be noticed that the binder may be placed around the hose, and the arms G thereof be passed through the slot F on opposite sides of the main bar A, with a groove B¹ of the fulcrum B receiving the cross bar I of the binder, when, by turning the shaft D, the binder may be tightened upon the hose, after which the bar A or the hose with the binder, may be moved relatively to bend or return the arms G so they will clasp the cross bar I, as will be understood from Fig. 3 of the drawing.

The main bar A may be used as a hand lever, or for bench purposes. It may be secured to a bench by means of a box clamp J, as shown in Fig. 2, or the main bar A may be secured to a bench by inserting the pin shown at the lower end of the bar in Fig. 2 in a hole or socket in the bench.

I prefer to employ the fulcrum B grooved at B¹, as shown in Figs. 1, 2 and 3, and it will be understood that when so used, the said fulcrum received bar I, as shown in Fig. 1, and prevents any slipping of the parts.

Manifestly, my invention will be found useful in repairing hose, as well as securing nipples and other fittings to hose.

I claim:

1. A tool substantially as described, comprising a main bar or handle, having a transverse opening and also having at the side of said bar a fulcrum surface, and a shaft journaled in said opening, and having in its free end a slot extending transversely across the shaft whereby the arms of a wire binder may extend transversely through the shaft, the slot being of a length in excess of the thickness of the main bar, and adapted to receive the arms of a wire binder substantially as set forth.

2. A tool for use in repairing hose, comprising a main bar having at one side a projecting fulcrum with a groove in its end for the reception of a cross bar of a wire binder, the said main bar having a transverse opening and a shaft journaled in said opening, and having passages for arms of a wire binder, and adapted to be rotated in said opening for tightening the binder substantially as set forth.

3. A tool substantially as described, comprising a main bar, means at the lower end of the main bar for securing the same to a bench, the main bar having above said means a transverse opening for a shaft and laterally thereto, a fulcrum surface for bearing against a hose being repaired, and a shaft journaled in said opening, and having means for engaging the arms of a wire binder substantially as set forth.

4. A tool substantially as described, having a transverse opening for a shaft, and also having at the side of said tool a fulcrum surface to bear against a hose, and a shaft journaled in the opening, and having means for engaging the arms of a wire binder substantially as set forth.

5. A tool substantially as described, comprising a main bar, having an opening for a shaft, and also having at the side of said bar a fulcrum surface and a shaft journaled in said opening and having a slot extending laterally through the shaft for the passage of the arms of a wire binder.

6. A tool for use in setting a bail-like hose binder comprising a main bar having a fulcrum surface at the side and a shaft journaled transversely of said bar and slotted from side to side for the passage of the arms of a bail-like binder, substantially as set forth.

7. A tool for use in repairing hose comprising a main bar having at one side a projecting fulcrum and also provided with a transverse opening, and a shaft journaled in said opening and constructed to permit the passage of the arms of a wire binder transversely through the shaft, substantially as set forth.

THOMAS H. WIEDER.

Witnesses:
W. E. COLEY,
CHAS. C. BUBB.